United States Patent [19]

Eliasson et al.

[11] Patent Number: 5,720,086
[45] Date of Patent: Feb. 24, 1998

[54] CLAMPING COLLAR

[75] Inventors: Roger Eliasson, Hestra; Morgan Ryhman, Anderstorp, both of Sweden; Philippe Bechler, Selles, Belgium

[73] Assignee: ABA of Sweden AB, Anderstorp, Sweden

[21] Appl. No.: 628,701
[22] PCT Filed: Oct. 19, 1993
[86] PCT No.: PCT/SE93/00852
§ 371 Date: Oct. 2, 1996
§ 102(e) Date: Oct. 2, 1996
[87] PCT Pub. No.: WO95/11403
PCT Pub. Date: Apr. 27, 1995
[51] Int. Cl.[6] ........................................... F16L 33/00
[52] U.S. Cl. ........................ 24/279; 24/280; 24/285
[58] Field of Search .................... 24/279, 280, 281, 24/285; 285/410; 411/410, 411

[56] References Cited

U.S. PATENT DOCUMENTS

| 649,916 | 5/1900 | Dietrich | 24/279 |
| 2,663,582 | 12/1953 | Sebok. | |
| 2,828,525 | 4/1958 | Gail | 24/279 |
| 2,863,203 | 12/1958 | Dalpiaz | 24/279 |
| 2,897,569 | 8/1959 | Kastner. | |
| 3,334,388 | 8/1967 | Turbyfill | 24/279 |
| 4,834,431 | 5/1989 | Calmettes et al. . | |
| 5,010,626 | 4/1991 | Dominguez | 24/279 |

FOREIGN PATENT DOCUMENTS

| 31 46 219 | 5/1983 | Germany. |
| 466415 | 2/1992 | Sweden. |

*Primary Examiner*—Victor N. Sakran
*Attorney, Agent, or Firm*—Cushman Darby & Cushman IP Group of Pillsbury Madison & Sutro LLP

[57] ABSTRACT

A clamping collar for sealing by perimetrically connecting the axially aligned ends of two parts which are circular in external transverse cross-sectional shape. The collar includes a strip formed into an open loop, V-shaped in longitudinal section, having two circumferentially opposite ends, and a tightener for extending force on the ends for circumferentially tightening the collar on the ends of the two parts. The tightener includes a separator for separating the two ends when the collar is loosened, for facilitating the opening and removal of the collar from the parts.

10 Claims, 3 Drawing Sheets

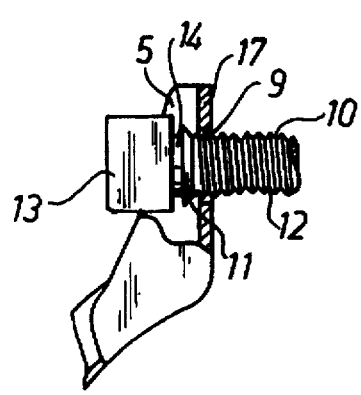
Fig. 6
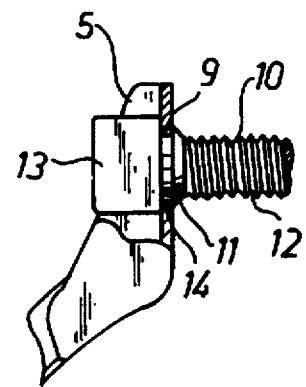
Fig. 7
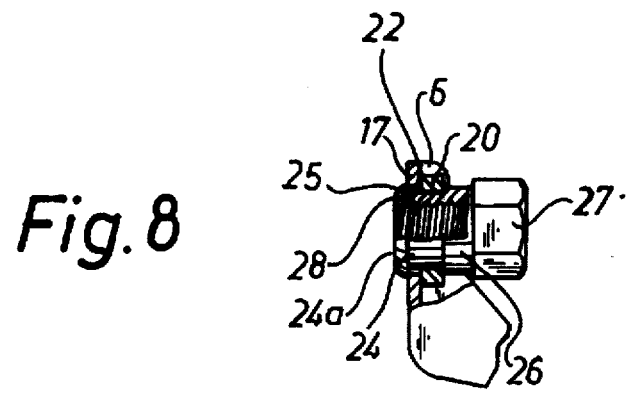
Fig. 8
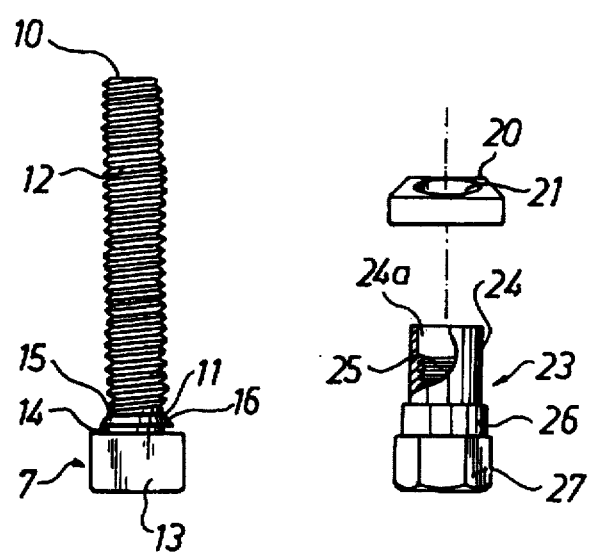
Fig. 4
Fig. 5

CLAMPING COLLAR

BACKGROUND OF THE INVENTION

The present invention relates to a clamping collar for hermetically (i.e. perimetrically sealingly) connecting axially aligned ends of two tubular parts, in particular those designed to form the exhaust conduit of a vehicle exhaust pipe.

It will find an application in all those sectors of economic activity in which it is necessary to have recourse to a clamping collar in order to ensure the hermetic connection of two parts, in particular of circular cross-section and, more particularly, in the field of motor vehicle construction for the manufacture of exhaust pipes.

Such clamping collars further have the function of exerting tangential stress upon the member about which they are placed in order, in particular, to cause a reduction of their radial dimensions and thus to ensure clamping.

There are currently various types of clamping collar in existence, the shape and constitution of which are, furthermore, adapted to their intended use.

In particular, in certain specific applications, such clamping collars further have to possess properties enabling them to ensure the hermetic connection of the parts. Such a characteristic is required, in particular, in the case of their application to the hermetic connection of conduits constituting the exhaust system of a vehicle.

It should also be noted that, in such applications and, in particular, in the exhaust systems of engines and most especially of vehicles, such collars also have to withstand high temperatures, as well as considerable temperature variations. Furthermore, they also have to withstand substantial mechanical forces and stresses resulting, in particular, from the vibrations and dynamic stresses arising from the operation of the engine.

To enable these different forces and stresses to be withstood, the connection between the two successive portions of an exhaust system can be provided by a clamping collar having a substantially V-shaped cross-section and into which the ends to the two portions of the exhaust system that are in contact are intended to fit, these two ends further having substantially conical matching bearing surfaces projecting perpendicularly to their cylindrical outer surfaces.

Such clamping collars are constituted, for example, by two rigid semi-cylindrical parts each terminating at their end in a fixing ring and being held together by means of screws passing through the facing lugs of the collar.

There is thus obtained a close, strong contact between the collar and the two portions of the exhaust system. However, in practice, such collars do not give satisfaction since they are of complex design, and they are not always easy to put into place or remove, which, it will be appreciated, leads to added costs when assembling or disassembling a vehicle exhaust system.

Furthermore, such collars necessitate the fitting of at least two bolts so as to assemble and clamp the two rings of the collar. The clamping forces are thus poorly exploited and, especially, poorly distributed, since they tend to draw together the two semi-circular members constituting the relatively rigid collar without exerting uniform traction distributed over its periphery, which is detrimental to the sealing characteristics of the clamping of the two parts of the exhaust system.

To remedy these drawbacks there has been devised a collar that is constituted by an open ring, the cross-section of which is in the shape of an inverted V and the ends of which comprise bearing lugs, for clamping means, which lugs extend radially into the vicinity of the internal periphery of the ring.

For this purpose there has been devised a ring that is deformable for tightly pressing against one another the conically shaped matching bearing surfaces of the tubes, and which has means for clamping and holding the ring in closed position, constituted in a manner known per se by a nut and screw assembly. On its periphery, the head of the screw has a V-shaped notch corresponding to the cross-section of the ring so as to come to bear on a first lug at least in the area of connection thereof to the ring. There is also provided, between the nut and the second lug, a stop analogous to that of the head of the screw, slidingly mounted on the screw and designed to come to bear on the said second lug at least in the area in which it is connected to the ring.

In practice, such clamping collars are also difficult to remove, which gives rise to numerous drawbacks, particularly when it is necessary to replace a vehicle exhaust system.

Now, vehicle exhaust members are generally subject to rusting phenomena, all the more swiftly in that they are heated to high temperatures. Moreover, they are placed beneath the vehicle and, as a result, through their arrangement and their positioning, they are also liable to receive all sorts of projections, so that their different component parts tend to jam, thus making their disassembly a delicate matter.

Furthermore, with such currently used collars, the replacement of one of the parts in a vehicle exhaust system necessitates the replacement of the clamping collar which, in addition to the cost increase arising from the difficulty of dismounting it, generates an increase in the price of such operations.

SUMMARY OF THE INVENTION

The object of the present invention is to remedy the drawbacks of presently known collars by providing a clamping collar for hermetically connecting two parts intended, in particular, to form the exhaust conduit of a vehicle, which is easy to install and/or remove, while, at the same time, ensuring hermetic connection of the different members in the exhaust system.

Furthermore, with a collar according to the invention, the mechanical fixing and hermetic properties are obtained together with ease of assembly and disassembly. These hermetic properties also make for a reduction of undesirable noise, which broadens its potential applications.

Another object of the invention is that it should be possible for the clamping collar to be mass produced without necessitating the implementation of complex means, thus reducing its cost and its cost price.

A further object of the invention is that it should be possible to re-use the clamping collar if necessary after removal and, in particular, after the replacement of those parts of the exhaust system that have to be changed.

Another object of the present invention is to provide a clamping collar that is of a robust design so that it can withstand the various phenomena of rusting and/or mechanical stress resulting from its use for the hermetic connection of parts such as, in particular, those of the exhaust conduits of a vehicle exhaust pipe.

Further objects and advantages of the present invention will emerge in the course of the following description, which is given only by way of illustration and is not intended to limit same.

For this purpose, the invention provides a clamping collar for connecting two parts having a circular cross-section, designed, in particular, to form a vehicle exhaust conduit, comprising:

a strip bent into an open loop whereof the ends, spaced from one another, have substantially radially extending bearing lugs;

clamping means pressing in the area of the ends to exert a circumferential stress clamping the collar onto said parts.

It is characterized by the fact that the clamping means comprise means for separating the two ends when they are unclamped with a view to facilitating its opening and removal.

BRIEF DESCRIPTION OF THE DRAWINGS

The present invention will be more readily understood upon reading the following description accompanied by the annexed drawings, wherein:

FIG. 4 is a schematic view illustrating a tightening screw according to the invention;

FIG. 5 is a schematic exploded view illustrating the component parts of the tightening screw according to the invention;

FIG. 6 is a view in partial cross-section schematically illustrating a bearing lug which cooperates with the tightening screw in non-locked position;

FIG. 7 is a view similar to that of FIG. 6 schematically illustrating the tightening screw in locked position;

FIG. 8 is a partially cross-sectional view schematically illustrating a bearing lug which cooperates with a tightening screw;

DETAILED DESCRIPTION

Figure 3:
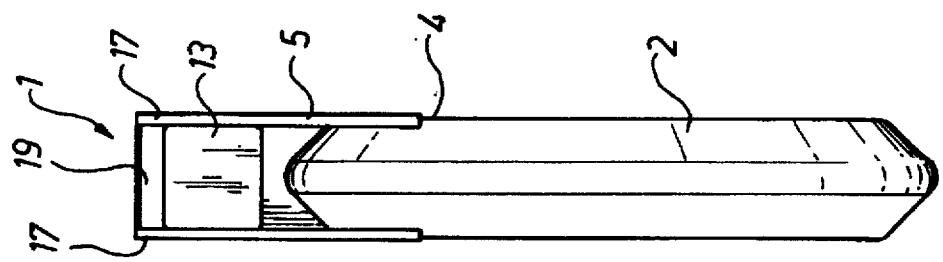
FIG. 3 is a schematic view in the direction of arrow $F_2$ of FIG. 1 schematically representing a bearing lug of the collar according to the invention which cooperates with the head of the tightening screw.

The present invention relates to a clamping collar 1 for hermetically connecting two parts of circular cross-section, designed, in particular, to constitute the exhaust system of a vehicle exhaust pipe. It will find an application, in particular, in the automotive industry for the purpose of connecting and clamping the various exhaust members, but it is also perfectly feasible to have recourse to this clamping collar in any other sectors of economic activity in which two parts, in particular having a circular cross-section, have to be connected hermetically.

Furthermore, such parts to be connected have, in the type of application described, facing ends to be assembled which have matching bearing surfaces of substantially conical shape projecting substantially perpendicularly in relation to their cylindrical outer surfaces.

To assemble such parts the collar 1 according to the invention takes the form, herein, of an open ring 2 made of a metallic material, the cross-section of which is V-shaped. Such a collar is generally produced using conventional manufacturing techniques and, in particular, by the forming of a flat sheet of metal. The thickness of the metal sheet will depend, of course, upon the applications, and it is further determined to afford appropriate resistance to the torsional stresses that will be applied to the collar during its clamping.

For the purpose of producing vehicle exhaust systems, use is made of two tubes manufactured from a metallic material, possessing adequate strength, but of small thickness and the ends for assembly of which have substantially conical matching bearing surfaces projecting substantially perpendicularly in relation to their cylindrical outer surfaces. That is the reason for which it is advantageous for the internal angle of the inverted V-section of the collar to match the angle formed by the conical sides of the facing conical surfaces of the parts to be assembled, so that it is possible to obtain, with such an arrangement, a sufficiently hermetic connection between these two tubes.

Each of the free ends, 3 and 4, of the ring 2 comprises a substantially radially extending bearing lug 5, 6.

According to the invention, this clamping collar 1 comprises clamping means applied in the area of the ends 3 and 4 to exert a circumferential stress clamping the collar, constituted by a screw-nut assembly 7 which comprises means 8 for separating the ends 3 and 4 and for enabling them to be slackened in order to facilitate the opening and removal of the collar 1.

These means 8 for slackening the collar are formed, on one hand, by an oblong orifice 9, provided in at least one of the bearing lugs 5, inside which is placed a screw 10 and, on the other hand, by a stop 11, provided substantially at one of the ends of the threaded shank 12 of screw 10, with a shape matching the oblong orifice 9, and which delimits, with head 13 of screw 10, an annular groove 14, as illustrated in FIG. 4.

It will be noted that stop 11 delimits two protuberances 15 and 16 which ensure that the clamping means are locked in translation when it is necessary to arrange the ring 2 in the area of connection of the two members of the exhaust system, and thus ensure hermetic connection between them.

It should also be emphasized that bearing lugs 5 and 6 have, on either side of a vertical median plane, a reinforcing side piece 17 which can be produced by appropriately upsetting the metal sheet during manufacture of the ring 2.

These reinforcing side pieces 17 delimit in the lug 5 a housing 18 and inside the lug 6 a housing 19.

Inside the housing 19 is placed a bearing ring 20 which is substantially square in shape and in which is provided, substantially in its central portion, an orifice 21 designed to take up a position facing an oblong orifice 22 provided in bearing lug 6.

This bearing ring 20 cooperates with a nut 23, such as the one that is more particularly illustrated in FIG. 5, and which comprises a cylindrical body 24 with an outside diameter that is substantially smaller than the inside diameter of orifice 21 and of oblong orifice 22, so as to be able to pass through them. This cylindrical body 24 is hollow 1 and it has an internal threaded portion 25 designed to cooperate with the thread of threaded shank 12.

The other end of body 24 of nut 23 comprises an annular ring 26 and ends in a head 27 which is, here, a hexagonal head.

Figure 2:
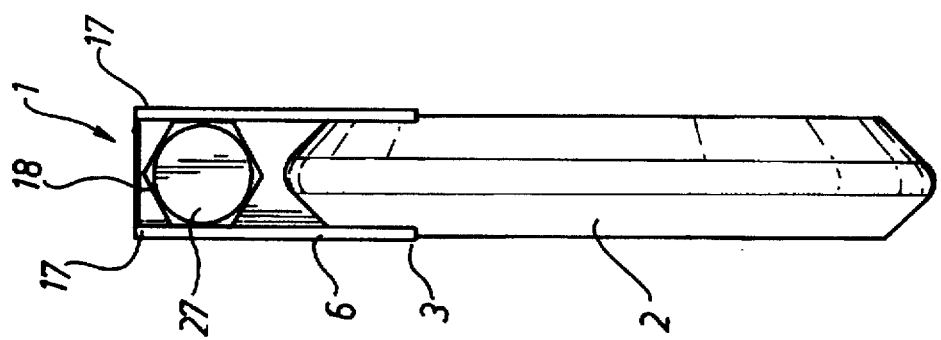
FIG. 2 is a schematic view in the direction of arrow $F_1$ of FIG. 1 illustrating a bearing lug of the clamping collar which cooperates with the head of the tightening screw.
Figure 1:
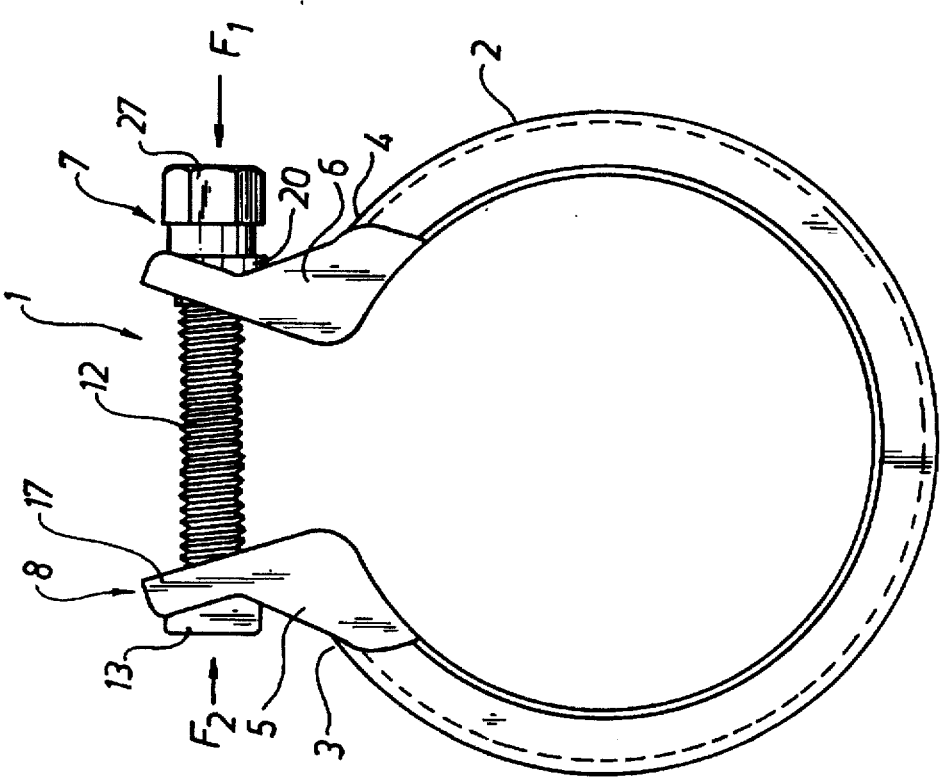
FIG. 1 is a front view schematically illustrating a collar according to the invention.

To ensure that the nut 23 is maintained in its mounted position, as more particularly illustrated in FIG. 2, the end 24a of cylindrical body 24 is bent back forming an annular skirt 28 which prevents any possibility of its displacement to cause it to leave the oblong orifice 22.

This annular skirt 28 is produced, in particular, by swaging or upsetting the end 24a of the cylindrical body 24 of nut 23 after the latter has been placed in a position such that it passes, on one hand, through orifice 21 and, on the other hand, through the oblong orifice 22 provided in lug 6, this operation being carried out during the manufacture of the collar in accordance with the invention prior to its being put into place, so that this nut 23 is already held in a working position, illustrated in FIG. 8, such as the one that will now be described.

To enable the collar 1 according to the invention to be put into place, it suffices firstly to position the body of ring 2 in the conical area of connection of the two members of the exhaust system.

By exerting a tightening action, for example through the use of a spanner (i.e. a wrench) on the head of the nut 27, one acts on the clamping means 7 and tightens the two ends, 3 and 4, of ring 2 so as to ensure hermetic connection of the two pieces of the exhaust system.

Furthermore, as a result of the tightening action, the head 13 which is, in particular, square, of screw 10 becomes rotationally locked inside housing 19 provided in bearing lug 6, and translationally locked via protuberances 15 and 16 and by the annular groove 14 that is located in a position such as illustrated in FIG. 7, so that efficient and appropriate clamping of the collar is obtained, ensuring hermetic, efficient connection of the two pieces.

It should be noted that, owing to the immobilization of screw 10 and of the tightening action exerted upon nut 27, regular homogenous distribution of the mechanical clamping forces and stresses is obtained, thus making it possible to ensure that the two pieces of the exhaust system are held efficiently and appropriately, while at the same time preventing localized deformation thereof prejudicial to their correct use.

It should also be noted that, owing to the special shape of oblong orifices 9, 22, provided respectively in bearing lugs 5 and 6, it is possible to ensure easy, swift installation, as well as good positioning of the different clamping members and, in particular, of screw 10, which further makes it possible to make up for the play that sometimes exists between the two pieces to be assembled.

According to the invention, collar 1 is also easy to dismount, which widens its potential uses and, in particular, permits its possible re-use when, for example, one of the pieces that has been assembled has to be replaced.

Furthermore, such dismounting of the collar 1 is simple, as it suffices to exert a slackening action, through the use of a spanner on head 27 of nut 23. This operation is facilitated, moreover, by the fact that the screw 10 is in a position, represented in FIG. 7, translationally locked via protuberances 15 and 16 and by groove 14, and rotationally locked via head 13, which is locked in housing 19 in bearing lug 5.

Thus, by applying a slackening action to the head of nut 27, using a spanner, one releases the thread 12 of screw 10 which is inserted inside the tapped portion 25 of nut 23 and through this action the two ends 3 and 4 of ring 2 are separated in order to be able to remove the collar 1 and release the two pieces that had been connected together in their conical portions.

Figure 9:
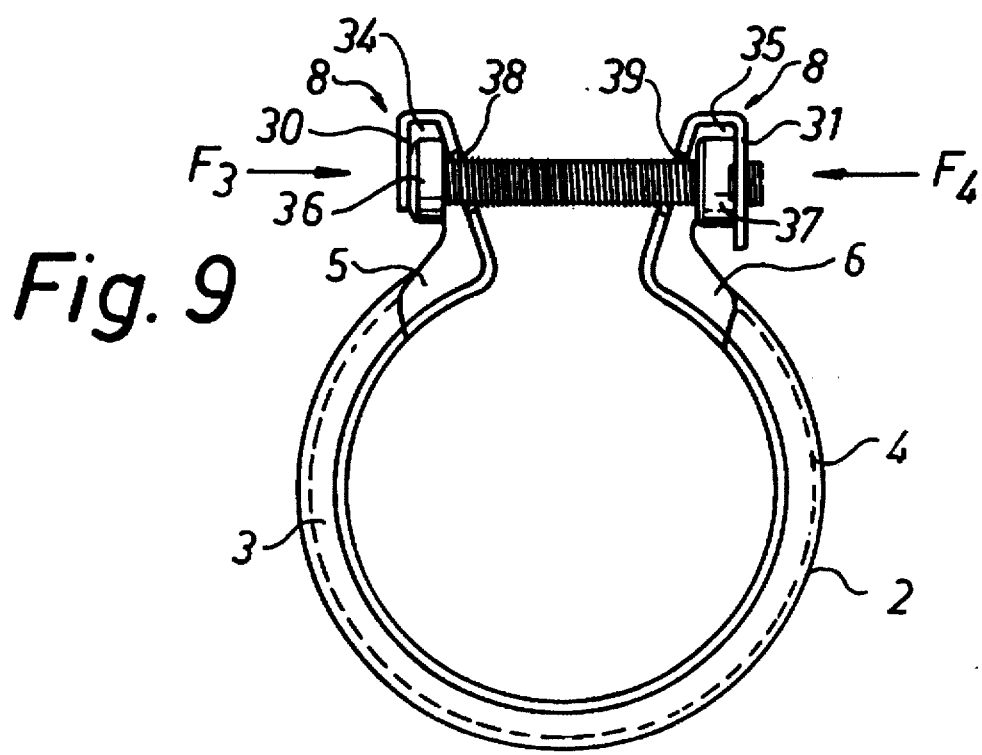
FIG. 9 is a front view schematically illustrating an alternative form of embodiment of a collar according to the invention.
Figure 10:
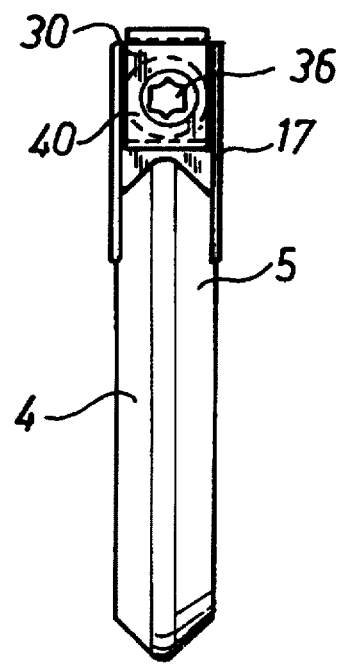
FIG. 10 is a schematic view in the direction of arrow $F_3$ of FIG. 9 schematically representing a bearing lug of the collar according to the alternative form of embodiment which cooperates with the head of the tightening screw.
Figure 11:
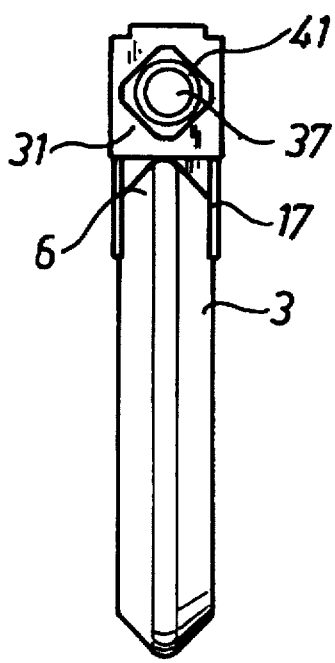
FIG. 11 is a schematic view in the direction of arrow $F_4$ in FIG. 9 schematically representing a bearing lug of the collar according to the alternative form of embodiment, which cooperates with the head of the tightening screw.

With more particular reference to FIGS. 9 to 11, an alternative embodiment of the collar according to the invention is represented whereof the elements common to those of the form of embodiment described previously bear the same references.

More precisely, here, means 8 are constituted by at least one curved portion 30 of lug 5 which delimits, with the body of ring 2, a housing 34 designed to receive the head 36 of a screw and by a curved portion 31 of lug 6 which also delimits, with the body of ring 2, a housing 35 designed to receive a nut 37.

Each lug 5, 6 comprises an orifice 38, 39, the inside diameter of which is slightly greater than the outside diameter of screw 10, and each curved portion 30, 31 also comprises an orifice 40, 41 having a diameter such as to facilitate the passage and putting into place of screw 10 and which is, in particular, oblong to facilitate the positioning of the tightening tool.

As regards curved portions 30, 31, these are obtained by machining and forming a flat metal sheet, as more especially illustrated in dotted lines in FIG. 9, wherein orifices 40 and 41 have been previously pierced. This operation is carried out after putting screw 10 into place through holes 38, 39 provided in each lug 5, 6 and the lock nut 37. To prevent the body of the screw from passing through orifice 38 provided in lug 5 the head 36 of the screw has a diameter which is far greater than that of the orifice.

To ensure that nut 37 is held and rendered integral with curved portion 31, the curved portion 31 of lug 6 is swaged, during manufacture of the collar, so that nut 37 is crimped in the strip of sheet metal and can no longer move translationally or rotationally. Of course, is it also conceivable to ensure that this nut 37 is immobilized using weld spots, but this technique would necessitate the implementation of far more complex means, which would increase the cost of manufacturing the collars. This method of immobilization further makes it possible to hold and put the screw 10 into place in an appropriate position.

It should also be noted that curved portions 30 and 31 make it possible to enhance the mechanical rigidity of this portion of the collar, which increases its potential applications, particularly under difficult conditions.

The diameter of orifice 40 of curved portion 30 is adapted to permit the passage of a tightening tool suitable for cooperating with the screw head 36 such as, for example, a head commonly known as a "torx" or "6 point socket".

Through the use of this tool, when a slackening action is applied to screw 10 by unscrewing the screw head 36, the tool holds the curved portion 30 in a given position and the screw head 36 comes into abutment with the curved portion inside housing 34, which makes it possible to slacken the collar more easily.

To re-tighten it suffices, using the tool, to apply a screwing action to the screw head 36 so as to cause the parts of the strip bent into an open loop, and in particular of the two spaced apart ends 3 and 4, to come together.

The present invention is not limited to this form of embodiment as described hereabove but it extends to all alternative forms of embodiment.

Other implementations of the present invention, within the grasp of a person of ordinary skill the art, could have been contemplated without thereby departing from the scope thereof.

We claim:

1. A clamping collar for connecting two axially aligned parts of circular transverse cross-sectional shape, comprising:
   a strip bent into an open loop having two opposite ends which are spaced from one another circumferentially of the strip and have two respective substantially radially extending bearing logs;
   a tighter arranged to press on said bearing logs for exerting circumferential stress for tightening the collar on the two parts to be connected;
   said tightener including a screw having a head, and a threaded shank, and a nut, said screw and said threaded shank threadedly engaging one another;
   the separator including a first curved portion of one of said logs, said first curved portion delimiting with said loop a first housing receiving and containing mobility of said head of said screw; and
   said separator further including a second curved portion of the other of said logs, said second curved portion delimiting with said loop a second housing receiving and constraining mobility of said nut.

2. The clamping collar of claim 1, wherein:
   said nut is integral with said second curved portion.

3. The clamping collar of claim 1, wherein:
   each said curved portion is provided with a respective orifice aligned with said screw.

4. The clamping collar of claim 1, wherein:
   said separator further includes an oblong orifice provided in said one of said bearing logs;
   said threaded shank of said screw extending through said oblong orifice;
   a stop having a shape, radially of said shank, matching that of said oblong orifice, said stop being provided on and projecting radially outward from said threaded shank near said head of said screw and defining with said head an annular groove extending circumferentially of said screw;
   said head and said stop being arranged to engage said one bearing log on axially opposite sides of said oblong orifice, thereby constraining axial mobility of said screw relative to said one bearing log.

5. The clamping collar of claim 4, wherein:
   said stop delimits two protuberances which constrain the screw against translation, by engagement with said one bearing log.

6. The clamping collar of claim 4, said separator further includes an oblong orifice provided in said other of said bearing logs;
   said nut having a wrench-turnable head and a body extending axially from said wrench-turnable head through said oblong orifice provided in said other of said bearing logs;
   said body, on an opposite side of said other of said bearing logs from said wrench-turnable head, having an upset portion which defines an annular skirt which is arranged to engage said other of said bearing logs, for constraining translation of said nut relative to said other of said bearing logs.

7. The clamping collar of claim 6, wherein:
   each of said bearing logs further includes on each side of a medial plane containing the longitudinal axis of said screw, a reinforcing side piece.

8. The clamping collar of claim 7, further comprising:
   a bearing ring carried on said body of said nut, for bearing between said head of said nut and said other of said lugs, between said reinforcing side pieces of said other of said lugs.

9. The clamping collar of claim 8, wherein:
   said nut further includes an annular ring formed thereon between said wrench-turnable head and said body of said nut, thereby defining an annular shoulder against which said bearing ring bears on said wrench-turnable head.

10. The clamping collar of claim 7, wherein:
    said head of said screw is square in radial profile and is accommodated between said reinforcing side process of said one lug.

* * * * *